US010021217B2

(12) United States Patent
Vajravel (10) Patent No.: US 10,021,217 B2
(45) Date of Patent: Jul. 10, 2018

(54) PROTOCOL INDEPENDENT WAY TO SELECTIVELY RESTRICT WRITE-ACCESS FOR REDIRECTED USB MASS STORAGE DEVICES (71) Applicant: Dell Products L.P., Round Rock, TX (US)

(72) Inventor: Gokul Thiruchengode Vajravel, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 235 days.

(21) Appl. No.: 14/833,531

(22) Filed: Aug. 24, 2015

(65) Prior Publication Data
US 2017/0063855 A1 Mar. 2, 2017

(51) Int. Cl.
G06F 21/00 (2013.01)
H04L 29/06 (2006.01)
G06F 21/62 (2013.01)
H04L 29/08 (2006.01)

(52) U.S. Cl.
CPC .......... H04L 67/42 (2013.01); G06F 21/62 (2013.01); H04L 67/1095 (2013.01); H04L 67/1097 (2013.01); H04L 69/22 (2013.01)

(58) Field of Classification Search
None
See application file for complete search history.

(56) References Cited

U.S. PATENT DOCUMENTS

| 7,664,903 | B2* | 2/2010 | Belonoznik | G06F 13/385 710/300 |
| 8,166,314 | B1* | 4/2012 | Raizen | G06F 21/78 711/164 |
| 8,893,013 | B1* | 11/2014 | Groves | G06F 3/1454 715/740 |
| 2002/0124108 | A1* | 9/2002 | Terrell | H04L 63/083 709/245 |
| 2005/0289383 | A1* | 12/2005 | Illowsky | G06F 1/3203 714/2 |

(Continued)

OTHER PUBLICATIONS

Mead, Joseph A.; Bartsch, Friedl. A High Speed Time-Stamping and Histogramming Data Acquistion System for Position Encoded Data. IEEE Nuclear Science Symposium Conference Record. Pub. Date: 2006. http://ieeexplore.ieee.org/stamp/stamp.jsp?tp=&arnumber=4179119.*

(Continued)

Primary Examiner — Jeremiah Avery
(74) Attorney, Agent, or Firm — Baker Botts L.L.P.

(57) ABSTRACT

Universal serial bus (USB) mass storage devices may be redirected to a server to create USB virtual mass storage devices. For characteristics of the redirected device to be propagated to other users (accessing the redirected device via the virtual device) it is necessary to alter the Mode Sense data. In one embodiment, certain users may be given only read-only access to the redirected device. In another embodiment only some of the redirected devices are write-protected. By saving characteristics of a redirected device in the server registry or active directory, the USB virtual bus driver may impose, for example, write-protection on one or more devices connected by one or more users.

20 Claims, 5 Drawing Sheets (56) References Cited

U.S. PATENT DOCUMENTS

| | | | |
|---|---|---|---|
| 2008/0235757 A1* | 9/2008 | Li | G06F 9/45558 726/1 |
| 2009/0037732 A1* | 2/2009 | Boccon-Gibod | G06F 21/10 713/168 |
| 2013/0097369 A1* | 4/2013 | Talagala | G06F 12/0246 711/103 |
| 2013/0103380 A1* | 4/2013 | Brandstatter | G06F 9/45558 703/26 |
| 2013/0227201 A1* | 8/2013 | Talagala | G06F 12/0246 711/103 |
| 2014/0195480 A1* | 7/2014 | Talagala | G06F 12/0804 707/610 |

OTHER PUBLICATIONS

Ramasamy, Arul Selvan; Karantharaj, Dr Porkumaran. File and System and Storage Array Design Challenges for Flash Memory. 2014 International Conference on Green Computing Communication and Electrical Engineering (ICGCCEE). Pub. Date: 2014. http://ieeexplore.ieee.org/stamp/stamp.jsp?tp=&arnumber=6922453.*

Nam, Young Jin; Park, Young Kyun; Lee, Jong Tae; Ishengoma, Frederick. Cost-Aware Virtual USB Drive: Providing Cost-Effective Block I/O Management Commercial Cloud Storage for Mobile Devices. 2010 IEEE 13th International Conference on Computational Science and Engineering (CSE). http://ieeexplore.ieee.org/stamp/stamp.jsp?tp=&arnumber=5692512.*

* cited by examiner

Mode Parameter Header (6)

| byte | bits | | | | | | | |
|---|---|---|---|---|---|---|---|---|
| | 7 | 6 | 5 | 4 | 3 | 2 | 1 | 0 |
| 0 | Mode Data Length | | | | | | | |
| 1 | Medium Type | | | | | | | |
| 2 | Device-Specific Parameter | | | | | | | |
| 3 | Block Descriptor Length | | | | | | | |

*FIG. 4A*

Device-Specific Parameter Field

| bit | 7 | 6 | 5 | 4 | 3 | 2 | 1 | 0 |
|---|---|---|---|---|---|---|---|---|
| 0 | WP | Reserved | | DPOFUA | Reserved | | | |

*FIG. 6*

PROTOCOL INDEPENDENT WAY TO SELECTIVELY RESTRICT WRITE-ACCESS FOR REDIRECTED USB MASS STORAGE DEVICES

FIELD

The disclosure relates in general to restricting access to remote devices, and more particularly to a protocol independent way to selectively restrict write access to a redirected universal serial bus (USB) mass storage device.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One approach to the design and implementation of information handling systems for computer networks, particularly with regard to the development of client/server applications, includes designing client applications and client terminals so that the majority of the heavily used resources are at a remote computing machine, such as a centralized server, connected via a network. The client terminals generally have minimal memory, disk storage, and processor power, but are designed under the premise that most users connected to a powerful server do not need the additional processing power. With these client terminals, the total cost of ownership is minimized, because of the reduced resources and because the clients can be centrally administered and updated from the server. As such, these client terminals are suited for a network that can handle a significant number of terminals. If the client terminals have devices attached to them, then when the client terminals are connected to the server, not only the client terminals but also the client terminals' devices can become available to the server.

Some information handling systems have externally connected mass storage devices, such as universal serial bus (USB) mass storage devices, that have been redirected. One of the ways to protect the USB mass storage device from malicious software or improper access is to restrict the write-access to the USB mass storage device at the server where the device has been virtualized. That is, the USB mass storage device is seen as a read-only device by any information handling system that attempts to access the virtual device. Using current technology, all redirected USB mass storage devices that have been virtualized, such as a USB mass storage device that has been redirected to a particular server, must all be designated as read-only for all users regardless of a particular user's access permissions. Thus, a need exists to selectively restrict the write-access for certain USB mass storage devices.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Frequently, devices connected to client terminals (also referred to as "clients" or "client-side devices") are virtualized on a server to provide access to the devices from user sessions on the server. The virtualized devices (or redirected devices) are accessible from a large number of user sessions and/or client terminals providing many client terminals the necessary support to fulfill a given computing function. For example, in an office environment, multiple user sessions and/or clients may be connected to a server on which the device is virtualized (or redirected), and all of the multiple user sessions and/or clients connected to the server may have access to the device. A user's virtualized device connected to the user's client terminal may not be accessible by other devices connected to other client terminals, for example, universal serial bus (USB) devices connected to a user's client terminal may only be accessible by the user at that client terminal.

A need therefore exists for systems and methods that provide selective restricted access to redirected USB mass storage devices, such that access to such USB mass storage devices may permitted or restricted for other users of the computer network other than the host client terminal that is connected to a given USB mass storage device. Further, the USB mass storage devices that have been redirected need to have access restricted based on either a per USB mass storage device basis or a per user basis.

In the following description, details are set forth by way of example to facilitate discussion of the disclosed subject matter. It should be apparent to a person of ordinary skill in the art, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices (such as USB mass storage devices), one or more communications ports for communicating with external devices as well as various input and output (I/O) devices, such as a keyboard, a mouse, a wireless device, for example, a Bluetooth device, a video display, and any other device known to one of ordinary skill in the art. The information handling system may also include one or more buses operable to transmit communication between the various hardware components.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Particular embodiments are best understood by reference to FIGS. 1-6, wherein like numbers are used to indicate like and corresponding parts.

Figure 1:
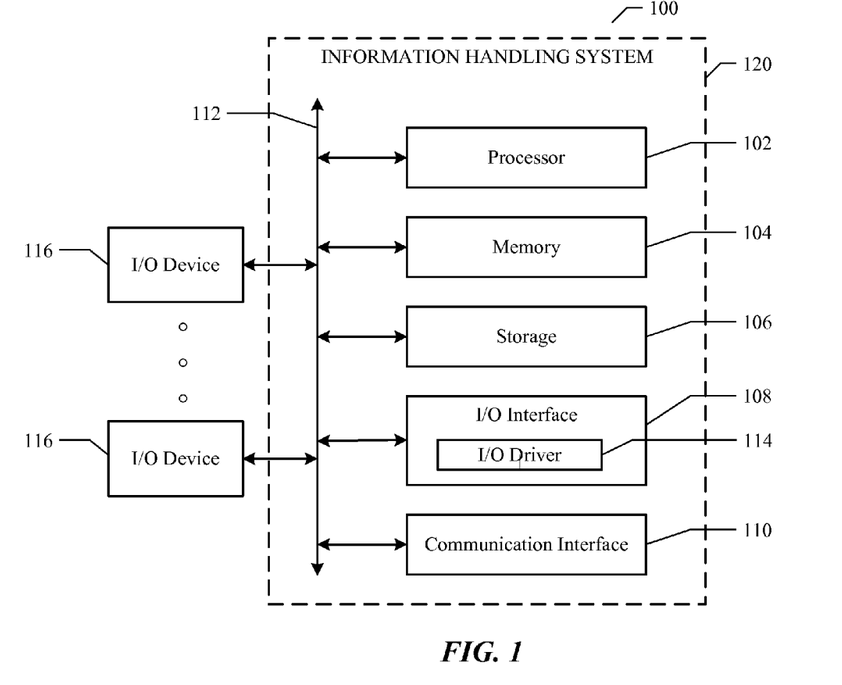
FIG. 1 is a conceptual block diagram of selected elements of an information handling system according to one embodiment of the present disclosure.

FIG. 1 illustrates a simplified diagram of information handling system configuration 100 in accordance with an aspect of the present disclosure. In particular embodiments, one or more information handling systems 120 perform one or more steps of one or more methods described or illustrated herein. In particular embodiments, one or more information handling systems 120 provide functionality described or illustrated herein. In particular embodiments, software running on one or more information handling systems 120 performs one or more steps of one or more methods described or illustrated herein or provides functionality described or illustrated herein. Particular embodiments include one or more portions of one or more information handling systems 120. Herein, reference to an information handling system may encompass a computing device, and vice versa, where appropriate. Moreover, reference to an information handling system may encompass one or more information handling systems, where appropriate.

This disclosure contemplates any suitable number of information handling systems 120. This disclosure contemplates information handling system 120 taking any suitable physical form. As example and not by way of limitation, information handling system 120 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, a terminal, a thin client, a slim client, a lean client, or a combination of two or more of these. Where appropriate, information handling system 120 may include one or more information handling systems 120; be unitary or distributed; span multiple locations; span multiple machines; span multiple data centers; or reside in a cloud, which may include one or more cloud components in one or more networks. Where appropriate, one or more information handling systems 120 may perform without substantial spatial or temporal limitation one or more steps of one or more methods described or illustrated herein. As an example and not by way of limitation, one or more information handling systems 120 may perform in real time or in batch mode one or more steps of one or more methods described or illustrated herein. One or more information handling systems 120 may perform at different times or at different locations one or more steps of one or more methods described or illustrated herein, where appropriate.

In particular embodiments, information handling system 120 includes a processor 102, memory 104, storage 106, an input/output (I/O) interface 108, a communication interface 110, a bus 112, and an I/O driver 114. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up one or more modules of a computer program, for example, software. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 120 may load instructions from storage 106 or another source (such as, for example, another information handling system 120) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a USB drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 120 and one or more I/O devices 116. Information handling system configuration 100 may include one or more of these I/O devices 116, where appropriate. In particular embodiments, the device 116 may be a device with a USB interface for a serial port or a parallel port or both, a serial port interface, a parallel port interface, or a combination thereof. One or more of these I/O devices 116 may enable communication between a user (such as a person, administrator, another device or information handling system) and information handling system 120. As an example and not by way of limitation, an I/O device 116 may include a wireless device (such as a Bluetooth device or a USB device), a keyboard, keypad, microphone, monitor, mouse, printer, facsimile, scanner, speaker, still camera, stylus, tablet, touch screen, trackball, video camera, another suitable I/O device 116 or a combination of two or more of these I/O devices 116. An I/O device 116 may include one or more sensors. This disclosure contemplates any suitable I/O devices 116 and any suitable I/O interfaces 108 for them. Where appropriate, I/O interface 108 may include one or more I/O drivers (such as device or software drivers) 114 enabling processor 102 to drive one or more of these I/O devices 116. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both for providing one or more interfaces for communication (such as, for example, packet-based communication) between information handling system 120 and one or more other information handling systems 120 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 120 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 120 may communicate with a wireless PAN (WPAN) (such as, for example, a BLUETOOTH WPAN), a WI-FI network, a WIMAX network, a cellular telephone network (such as, for example, a Global System for Mobile Communications (GSM) network), or other suitable wireless network or a combination of two or more of these. Information handling system 120 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 120 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

Figure 2:
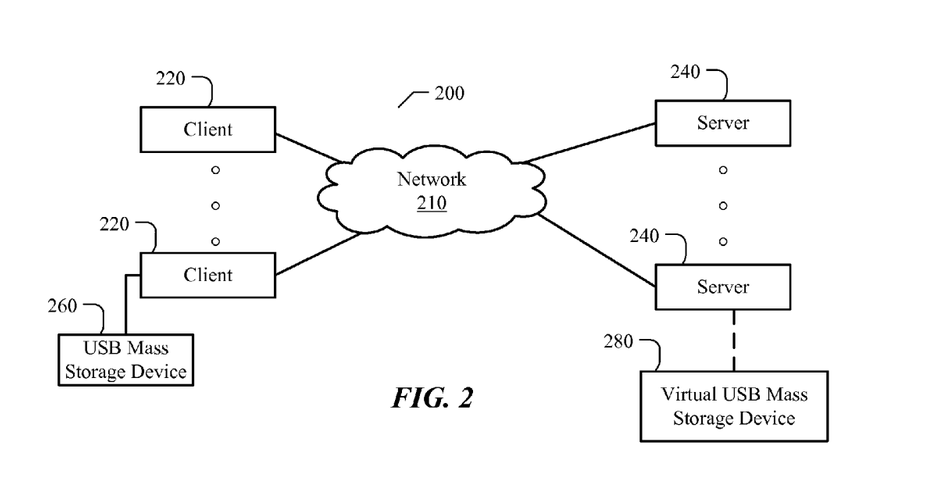
FIG. 2 is a conceptual block diagram of selected elements of a computer network environment according to one embodiment of the present disclosure.

FIG. 2 is a conceptual block diagram of selected elements of a computer network environment 200 according to an aspect of the disclosure. In particular embodiments, one or more client devices 220 and one or more servers 240 are connected via network 210. Network 210 may be a public network or a private (for example, corporate) network. Additionally, network 210 may be, for example, a Local Area Network (LAN), a Wide Area Network (WAN), a wireless network, the Internet, an intranet or any other suitable type of network. One or more client devices 220 may be connected to the network 210 via a network switch (not shown). In particular embodiments, network 210 may include one or more routers for routing data between client devices 220 and/or servers 240. A device (for example, a client device 220 or a server 240) on network 210 may be addressed by a corresponding network address including, for example, an Internet protocol (IP) address, an Internet name, a Windows Internet name service (WINS) name, a domain name or other system name. In particular embodiments, network 210 may include one or more logical groupings of network devices such as, for example, one or more sites (for example, customer sites) or subnets. As an example, a corporate network may include potentially thousands of offices or branches, each with its own subnet (or multiple subnets) having many devices. One or more client devices 220 may communicate with one or more servers 240 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Client device 220 may be a desktop computer, a laptop computer, a tablet computer, a handheld device, a mobile phone, a kiosk, a vending machine, a billboard, or any suitable information handling system 120. In particular embodiments, a client device 220 is an embedded computer and may have flash memory (for example, a solid state drive) instead of a hard disk drive. In particular embodiments, a client device 220 is a thin client having limited processing capabilities and limited storage, and such a thin client may require minimal management and updates. A client device 220 may communicate with a server 240 via one or more protocols such as Hypertext Transfer Protocol (HTTP), Hypertext Transfer Protocol Secure (HTTPS), File Transfer Protocol (FTP), Common Internet File System (CIFS), Independent Computing Architecture (ICA) protocol (developed by Citrix Systems, Inc.), Remote Desktop Protocol (RDP) (developed by Microsoft Corporation), or any suitable protocol or combination of protocols.

In particular embodiments, a client device 220 may connect to a USB mass storage device 260. While only one USB mass storage device 260 is shown, the present invention contemplates client device 220 connecting to any number of USB mass storage devices 260. Further, the present invention contemplates any number of client devices 220 connecting to one or more USB mass storage devices 260 such that multiple client devices 220 may be connected to one or more unique USB mass storage devices 260. In particular embodiments, any number of client devices 220 may be connected to the same USB mass storage device(s) 260, different USB mass storage device(s) 260, or any combination thereof.

A server 240 may include one or more of: a computing device, a desktop computer, a laptop computer, a database, a corporate server, a repository server, a configuration application server, a domain name system (DNS) server, a dynamic host configuration protocol (DHCP) server, a virtual machine (for example, VMware® Virtual Machine), a desktop session (for example, Microsoft Terminal Server), a published application (for example, Microsoft Terminal Server), or any suitable information handling system 120. As an example, a private (for example, corporate) network may include a device manager server and a repository server each configured to communicate with multiple client devices 220 across one or more domains, sites, or subnets of network 210. In particular embodiments, a server 240 may include one or more servers, or functions of one or more servers. A client device 220 may access software resources provided by a server 240 such as, for example, operating systems, add-ons, content, or any other suitable data, applications, or images. In particular embodiments, a client 220 may access resources provided by a server 240 only after providing suitable authentication information. Alternatively, a server 240 may provide software or other resources automatically to one or more client devices 220.

It may be desirable, in the case of a private (for example, corporate) network including multiple sites or subnets to deploy software (including, for example, all or part of one or more operating systems, applications, add-ons, or data) to one or more client devices 220 across one or more sites or subnets. The client devices 220 may, for example, be located remotely from one or more servers 240 (including, for example, device managers or resource repositories).

In particular embodiments, one or more servers 240 of a network 210 may include a virtual USB device 280, such as a USB mass storage device. While the virtual USB device 280 is not locally or physically connected to the server 240, the virtual USB device 280 appears to the server 240 as if it is locally connected to the server 240. Thus, USB device 260 appears to the server 240 as a virtual USB device 280. While only one virtual USB device 280 is shown, the present invention contemplates server 240 virtualizing and accessing any number of virtual USB devices 280 corresponding to any one or more USB mass storage devices 260 connected to any one or more client devices 220. Further, the present invention contemplates any number of servers 240 accessing one or more virtual USB devices 280 such that multiple servers 240 may access one or more virtual USB devices 280. In particular embodiments, any number of servers 240 may access virtual USB device(s) 280, different virtual USB device(s) 280, or any combination thereof.

As used herein, a "local" device of information handling system 120, or a device "locally" connected to information handling system 120, may be a device directly connected to the system using one or more wires or connectors (for example, physically connected to the system), or a device directly connected to the system using a wireless link. For example, USB mass storage device 260 is a local device connected using a USB connection to client device 220. Furthermore, in one aspect of the disclosure, a local device of an information handling system 120 or a device locally connected to information handling system 120 may include a device within the information handling system 120 (for example, an internal device (not shown) of client device 220).

A "remote" device, or a device "remote" to information handling system 120, may be a device that is not directly connected to information handling system 120. For example, server 240 is remote to both client device 220 and USB mass storage device 260 because server 240 is not directly connected to client device 220 or USB mass storage device 260 but connected indirectly through network 210, which can include, for example, another server 240, or the Internet.

In particular embodiments, client device 220 (for example, a thin client, a slim client, or a lean client) or one or more software components associated with client device 220 may depend on server 240 to fulfill its computational roles. As an example of a Virtual Desktop Infrastructure (VDI) and not by way of limitation, client device 220 may provide one or more terminal services to one or more users of client device 220. As such, the users of client device 220 may login to the same server 240 and perform tasks on the same server 240 substantially at the same time. In the VDI, one or more USB mass storage devices 260 may be connected to client device 220. In particular embodiments, in order for the USB mass storage devices 260 to work seamlessly, communications associated with the USB mass storage devices 260 may be redirected to a Virtual Desktop (VD) operating system (OS) or a Virtual Machine (VM) OS (for example, WINDOWS SERVER 2003) of the VDI.

Figure 3:
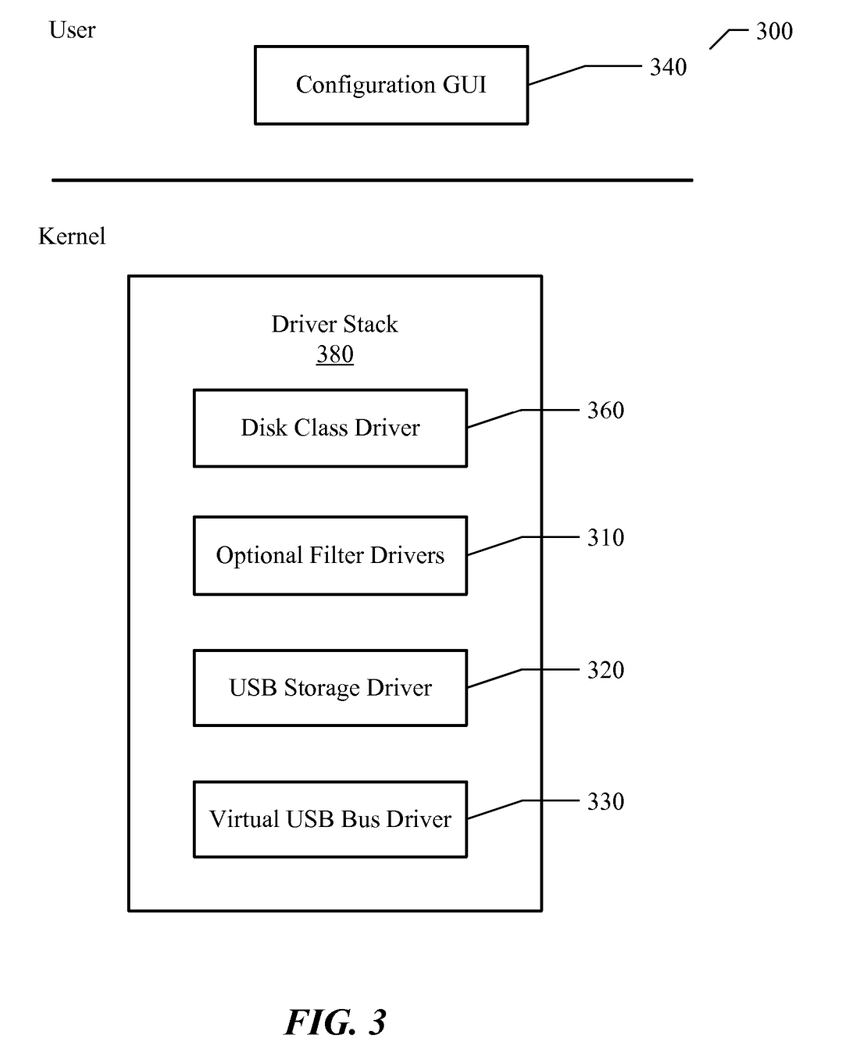
FIG. 3 is a conceptual block diagram of selected elements of a server according to one embodiment of the present disclosure.

FIG. 3 is a conceptual block diagram 300 of selected elements of a server for redirecting protocol independent USB mass storage devices according to one embodiment of the present disclosure. The driver stack 380 of a server 240 may exist as part of the server's kernel. The driver stack 380 may include several components that are utilized in one or more embodiments of the present disclosure. The virtual USB bus driver 330, such as Wyse USB bus driver wvusbbus.sys, creates a virtual USB mass storage device 280, at the server 240 of a redirected USB mass storage device 260 of a client 220. The redirected USB mass storage device 260 may be any USB mass storage device known to one of ordinary skill in the art. Any remoting protocol may be used to access the redirected USB mass storage device, including but not limited to, remote desktop protocol (RDP), Citrix independent computing architecture (ICA), personal computer over internet protocol (PCOIP) and any other protocol known to one of ordinary skill in the art. The virtual USB bus driver 330 will load all the necessary drivers associated with the virtual USB mass storage device 280. The virtual USB bus driver 330 transfers all the received USB commands to the physical device, such as USB mass storage device 260. If the USB mass storage device 260 is configured to be a read-only device, the virtual USB bus driver 330 sets appropriate device characteristics and shares the same to the upper layer drives (for example, via a SCSI MODE SENSE(6) command). This makes the disk class driver 360 restrict all the write access to the USB mass storage device 260 (and all other devices of the same type).

In one embodiment, the WP bit for a first type of a device is not set (read/write access is permitted) but is set (read-only is permitted) for a second type of a device. The virtual USB bus driver 330 is operable to selectively restrict write-access, that is, to only allow read-only access for the second type of device but allow read/write access to the first type of device. In another embodiment, if SLR is not enabled for a first user and the configuration characteristics for the first user indicate that all devices connected by the first user are read-only, then any device connected by the first user may be made available to other users for connection but only as read-only devices (WP bit set). In another embodiment, configuration characteristics associated with a second user indicate that devices connected by the second user should be read/write accessible. Then when the second user connects a device and SLR is not enabled, the device is made available to others with full read/write access (WP bit not set). Thus, selective restriction of devices is made possible in that a first type of device may be restricted as read-only whereas a second type of device may be read/write accessible and devices connected by a first user may be read-only whereas devices connected by a second user may be read/write.

The USB storage driver 320 converts all storage requests to the virtual USB mass storage device 280 into the appropriate USB language. For example, for virtual USB mass storage device 280, the USB storage driver 320 will convert storage requests to universal serial bus request blocks (URB) bulk transfers according to one or more USB specifications.

USB storage driver 320 along with disk class driver 360 cache or store one or more characteristics of the virtual USB mass storage device 280. One or more optional filter drivers 310 may be loaded on initialization of the virtual USB mass storage device 280. These optional filter drivers 310 provide additional value or modify the behavior of the disk class driver 360.

Configuration graphical user interface (GUI) 340 is a user interface that permits a user, such as an administrator, to input device characteristics for the type of device to be redirected, such as USB mass storage device 260. These characteristics are used to create the virtual USB device, such as virtual USB mass storage device 280. Any number of device characteristics known to one of ordinary skill in the art may be set, including the write-protect status and the read/write access permissions for one or more users. One or more of the characteristics may be stored in the system registry of the server 240, in an active directory or in any other location known to one of ordinary skill in the art. If stored in the registry, the stored characteristics apply only to the current server. If the characteristics are stored in the active directory, the characteristics may be used by other servers 240. For example, session level restrictions may be imposed that only permit read-only access on a user who does not have permission to write to a virtual USB mass storage device 280. In one embodiment, the characteristics stored in the active directory include a variable that indicates which servers should use the stored characteristics. In another embodiment, the characteristics stored in the active directory include a variable that indicates which characteristics apply to a specific user. The virtual USB bus driver 330 caches one or more of these characteristics in its internal data structure.

Figure 4A:
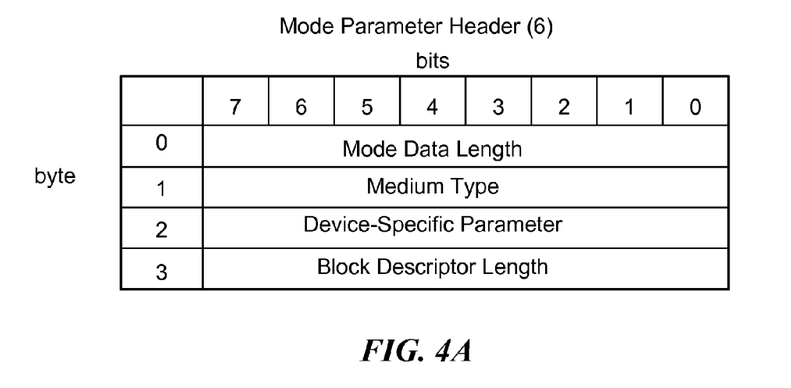
FIG. 4A illustrates a mode parameter header used by the MODE SENSE (6) command for one or more embodiments of the present disclosure.

FIG. 4A illustrates the mode parameter header that is used by the MODE SENSE(6) command. The MODE SENSE(6)

command provides a way for a device server to report parameters to an application client. The MODE SENSE(6) command is a command known to one of ordinary skill in the art as a small computer system interface (SCSI) command as set forth in one or more of the American National Standards Institute (ANSI) SCSI standards. The MODE DATA LENGTH field indicates the number of bytes of data that follow. The MEDIUM TYPE field contains a value that is unique for each device type, such as a USB mass storage device. This field may not be used. The MEDIUM TYPE is an attribute of a device that is hard-coded in the device at the time of manufacture. The DEVICE-SPECIFIC PARAMETER field also contains a value that is unique for each device type and each device may have its own defined device-specific parameter values. The BLOCK DESCRIPTOR LENGTH provides the length in bytes of all the block descriptors in the mode parameter list.

Figure 4B:
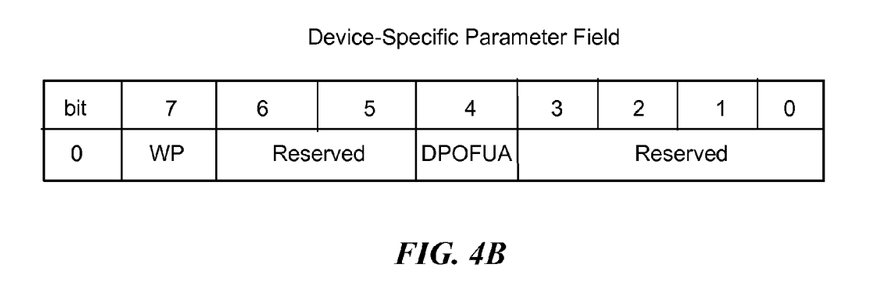
FIG. 4B illustrates a device specific mode parameter field for one or more embodiments of the present disclosure.

FIG. 4B illustrates a DEVICE-SPECIFIC PARAMETER field. As shown in FIG. 4B the DEVICE-SPECIFIC PARAMETER field for a device, such as a USB mass storage device 260, may include a bit (shown as bit 7) that indicates whether the device is write-protected (for example, a WP bit). If the device is write protected, then the WP bit may be set and if the device is not write protected, the then WP bit is not set. The Disable Page Out (DPO) and Force Unit Access (FUA) together form the DPOFUA bit which relates to caching. In one embodiment, a DPOFUA bit for a given USB mass storage device 160 is set to zero indicates that the USB mass storage device 260 does not contain a cached memory or does not support the DPO and FUA bits.

Figure 5:
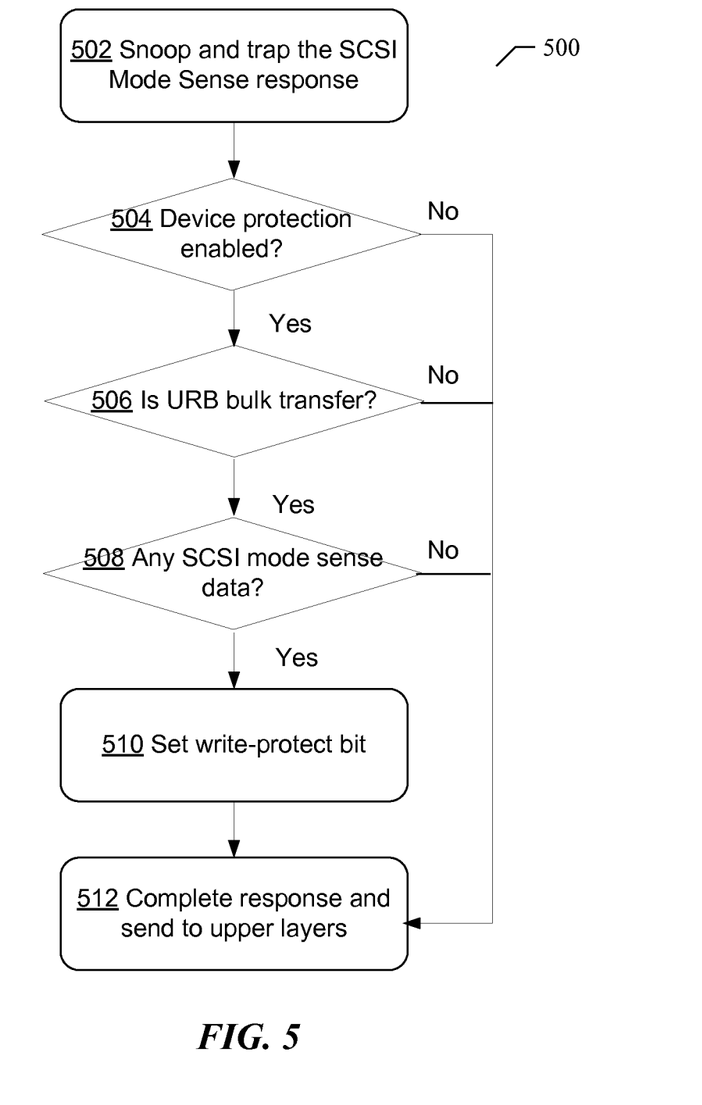
FIG. 5 is a flowchart illustrating an exemplary method for a protocol independent way to selectively restrict write-access for one or more redirected USB mass storage devices according to one or more embodiments of the present invention.

FIG. 5 is a flowchart illustrating an exemplary method for a protocol independent way to selectively restrict write-access for one or more redirected USB mass storage devices according to one or more embodiments of the present invention as shown generally at 500. During initialization of the USB storage driver 320 and disk class driver 360 USB mass storage device 260 that is being redirected, at step 502, the USB virtual bus driver 330 snoops and traps the SCSI Mode Sense response sent by the USB mass storage device 260 to the server 240. That is, the USB virtual bus driver 330 may parse the header for device-specific parameter field values as shown in FIGS. 4A and 4B.

Figure 6:
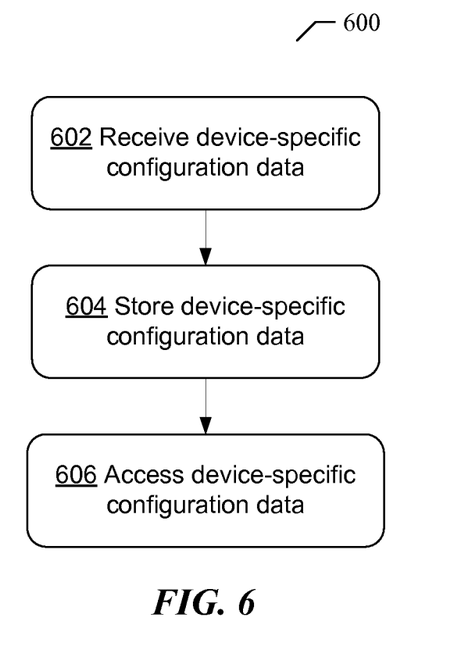
FIG. 6 is a flowchart illustrating a configuration according to one embodiment of the present disclosure.

At step 504, it is determined if the device protection for the USB mass storage device 260 is enabled. As shown in FIG. 6, it is illustrated generally at 600 one embodiment for obtaining characteristics associated with a USB mass storage device 260. When a device, such as USB mass storage device 260, is setup or initialized, at step 602 a server 240 may receive device-specific configuration data that may include certain characteristics, including characteristics that enable/disable write access to a given device and which users have or do not have such access. A user may input settings for one or more characteristics using a GUI, such as configuration GUI 340. Configuration GUI 340 may be a WYSE TCX configuration GUI or any other GUI known to one of ordinary skill in the art. At step 604, the device-specific configuration data is stored. Configuration data, for example, one or more characteristics, may be stored in the server 240 registry or in an active directory. At step 606 the configuration data is accessed. In one embodiment, the configuration data (characteristic associated with write-protection) is accessed as illustrated in step 504.

At step 506 it is determined if the response includes a URB bulk transfer. If the response is a URB bulk transfer then it is known that the redirected device is a USB mass storage device 260. At step 508 it is determined if any SCSI Mode Sense data exists. If the data does exist, the write-protect bit is set at step 510. That is the Mode Sense (6) header data is changed or altered such that the operating system of the server 240 sees the device as a write-protected device and only read requests should be permitted. All write commands will be blocked at the disk class driver 360 level. The response is completed and sent to the upper layers of the driver stack 380. That is, after altering the write-protect (WP) bit, the response is sent to the upper driver layers.

If the decision at steps 504, 506 and 508 is negative then the steps proceed directly to step 512.

Those of skill in the art would appreciate that items such as the various illustrative blocks, modules, elements, components, methods, operations, steps, and algorithms described herein may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (for example, one or more of blocks, modules, elements, components or processors) for performing one or more functions or operations. In one aspect, such an item may be an apparatus, hardware, or a portion thereof. In one example, an item may have a structure in the form of, for example, an instruction(s) encoded or stored on a machine-readable medium, on another device, or on a portion thereof. An instruction(s) may be software, an application(s), a subroutine(s), or a portion thereof. The instructions(s) may be for performing the function(s) or operation(s). The instruction(s) may be executable by one or more processors to perform the function(s) or operation(s). One or more processors may execute the instruction(s) by, for example, transferring or copying and instructions into an executable memory space and executing the instructions. In one example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (for example, a digital signal processor (DSP), an application specific integrated circuit (ASIC), a field programmable gate array (FPGA), etc.), as a portion(s) of any of the foregoing, or as a combination(s) of any of the foregoing. Those skilled in the art will recognize how to implement the instructions, circuits, and processing systems.

In one aspect of the disclosure, when actions or functions (for example, hooking, modifying, intercepting, redirecting, determining, traversing, obtaining, creating, operating, deleting, removing, receiving, providing, generating, converting, displaying, notifying, accepting, selecting, controlling, transmitting, reporting, sending, or any other action or function) are described as being performed by an item (for example, one or more of blocks, modules, elements, components or processors), it is understood that such actions or functions may be performed, for example, by the item directly. In another example, when an item is described as performing an action, the item may be understood to perform the action indirectly, for example, by facilitating such an action (for example, assisting, allowing, enabling, causing, or providing for, such action to occur; or performing a portion of such an action). For example, determining can refer to facilitating determination, attaching can refer to facilitating attaching, and receiving can refer to facilitating receiving. In one aspect, performing an action may refer to performing a portion of the action (for example, performing a beginning part of the action, performing an end part of the action, or performing a middle portion of the action).

A reference to an element in the singular is not intended to mean "one and only one" unless specifically so stated, but rather "one or more." For example, a client may refer to one or more clients, a server may refer to one or more servers, an operation may refer to one or more operations, and a signal, message, or communication may refer to one or more signals, messages, or communications.

Unless specifically stated otherwise, the term "some" refers to one or more. Pronouns in the masculine (for example, his) include the feminine and neuter gender (for example, her and its) and vice versa. Headings and subheadings, if any, are used for convenience only and do not limit the invention.

A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

In one aspect, the term "coupled" or the like may refer to being directly coupled. In another aspect, the term "coupled" or the like may refer to being indirectly coupled or communicatively coupled.

Various items may be arranged differently (for example, arranged in a different order, or partitioned in a different way) all without departing from the scope of the subject technology. In one aspect of the disclosure, the elements recited in the accompanying claims may be performed by one or more modules or sub-modules. For example, a local link creation module and a local link deletion module may be combined into one module.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
snooping and trapping a small computer system interface (SCSI) Mode Sense response from a first redirected universal serial bus (USB) mass storage device of a first client, wherein the SCSI Mode Sense response comprises one or more device-specific parameter field values;
determining if device protection is enabled for the first (USB) mass storage device;
determining if the response includes a USB request block (URB) bulk transfer;
determining if the response includes SCSI Mode Sense data;
setting a write-protect bit of a header of the response; and
sending the response to one or more upper layers of a driver stack.

2. The method of claim 1, further comprising:
setting one or more characteristics of the redirected USB mass storage device, wherein the one or more characteristics includes a write-protect characteristic;
storing the one or more characteristics of the redirected USB mass storage device; and
retrieving the write-protect status prior to the determining device protection enabled step.

3. The method of claim 2, wherein the one or more characteristics are stored in a system registry.

4. The method of claim 2, wherein the one or more characteristics are stored in an active directory.

5. The method of claim 2, wherein the one or more characteristics include access permissions for one or more users.

6. The method of claim 2, wherein the one or more characteristics include access permissions for one or more servers to one or more redirected devices.

7. The method of claim 1, further comprising:
blocking write commands by a disk class driver for a write-protected first USB mass storage device.

8. One or more computer-readable non-transitory storage media embodying software that is operable when executed to:
snoop and trap a small computer system interface (SCSI) Mode Sense response from a first redirected universal serial bus (USB) mass storage device of a first client, wherein the SCSI Mode Sense response comprises one or more device-specific parameter field values;
determine if device protection is enabled for the first (USB mass storage device;
determine if the response includes a USB request block (URB) bulk transfer;
determine if the response includes SCSI Mode Sense data;
set a write-protect bit of a header of the response; and
send the response to one or more upper layers of a driver stack.

9. The media of claim 8, wherein the software when executed is further operable to:
set one or more characteristics of the redirected USB mass storage device, wherein the one or more characteristics includes a write-protect characteristic;
store the one or more characteristics of the redirected USB mass storage device; and
retrieve the write-protect status prior to the determining device protection enabled step.

10. The media of claim 9, wherein the one or more characteristics are stored in a system registry.

11. The media of claim 9, wherein the one or more characteristics are stored in an active directory.

12. The media of claim 9, wherein the one or more characteristics include access permissions for one or more users.

13. The media of claim 8, wherein the software when executed is further operable to:
block write commands by a disk class driver for a write-protected first USB mass storage device.

14. A system comprising:
one or more processors; and
a memory coupled to the processors comprising instructions executable by the processors, the processors being operable when executing the instructions to:
snoop and trap a small computer system interface (SCSI) Mode Sense response from a first redirected universal serial bus (USB) mass storage device of a first client, wherein the SCSI Mode Sense response comprises one or more device-specific parameter field values;
determine if device protection is enabled for the first (USB) mass storage device;
determine if the response includes a USB request block (URB) bulk transfer;
determine if the response includes SCSI Mode Sense data;
set a write-protect bit of a header of the response; and
send the response to one or more upper layers of a driver stack.

15. The system of claim 14, wherein the processors are further operable when executing instructions to:
set one or more characteristics of the redirected USB mass storage device, wherein the one or more characteristics includes a write-protect characteristics;
store the one or more characteristics of the redirected USB mass storage device; and
retrieve the write-protect status prior to the determining device protection enabled step.

16. The system of claim 15, wherein the one or more characteristic are stored in a system registry.

17. The system of claim 15, wherein the one or more characteristics are stored in an active directory.

18. The system of claim 15, wherein the one or more characteristics include access permissions for one or more users.

19. The system of claim 15, wherein the one or more characteristics include access permissions for one or more servers to one or more redirected devices.

20. The system of claim 14, wherein the processors are further operable when executing instructions to:
block write commands by a disk class driver for a write-protected first USB mass storage device.

* * * * *